United States Patent
Bleyh

(10) Patent No.: US 6,565,098 B2
(45) Date of Patent: May 20, 2003

(54) CYLINDER HEAD GASKET AND PROCESS FOR THE MANUFACTURE THEREOF

(75) Inventor: Fritz Bleyh, Dettingen (DE)

(73) Assignee: Elringklinger AG, Dettingen (DE)

( * ) Notice: Subject to any disclaimer, the term of this patent is extended or adjusted under 35 U.S.C. 154(b) by 1 day.

(21) Appl. No.: 09/829,680

(22) Filed: Apr. 10, 2001

(65) Prior Publication Data

US 2001/0035616 A1 Nov. 1, 2001

(30) Foreign Application Priority Data

Apr. 13, 2000 (DE) .......................... 100 18 290

(51) Int. Cl.⁷ ................................................ F02F 11/00
(52) U.S. Cl. ........................ 277/592; 277/591; 277/593; 277/594; 277/595; 219/9.5
(58) Field of Search .................. 277/591, 592, 277/593, 594, 595; 219/9.5, 617

(56) References Cited

U.S. PATENT DOCUMENTS

| | | | | |
|---|---|---|---|---|
| 4,990,732 A | * | 2/1991 | Dudko et al. ............... | 219/617 |
| 5,385,354 A | * | 1/1995 | Hagiwara et al. ........... | 277/594 |
| 5,431,418 A | * | 7/1995 | Hagiwara et al. ........... | 277/592 |
| 5,568,932 A | * | 10/1996 | Tanaka et al. ............... | 277/595 |
| 5,713,580 A | * | 2/1998 | Ueta .......................... | 277/593 |
| 6,053,503 A | * | 4/2000 | Buck et al. .................. | 277/592 |

FOREIGN PATENT DOCUMENTS

| | | |
|---|---|---|
| EP | 0 486 817 B1 | 5/1992 |
| WO | WO97/31204 | 8/1997 |

* cited by examiner

*Primary Examiner*—Anthony Knight
*Assistant Examiner*—Enoch Peavey

(57) ABSTRACT

Process for manufacturing a cylinder head gasket with a gasket plate which comprises several sheet metal layers and with a metallic spacer ring which surrounds a combustion chamber through-opening of the cylinder head gasket and is welded by a ring-shaped weld seam to one of the sheet metal layers; to improve the sealing ability of the cylinder head gasket around the combustion chamber through-opening and to shorten the welding time, the spacer ring is secured in a gas-tight manner by electric pulse welding to the sheet metal layer carrying it by a continuous, ring-shaped, uniform weld seam closed within itself by the spacer ring and the sheet metal layer being clamped between a first electrode resting against the spacer ring and a second electrode resting against the sheet metal layer and a current pulse being passed through a ring-shaped, sharp edge-like or bead-like contact projection of the one electrode pressed against one of the parts to be welded to one another, through the parts to be welded to one another, and through the other electrode. A cylinder head gasket manufactured in this way has on the free side of the spacer ring and/or the sheet metal layer carrying it a ring-shaped, groove-like depression.

11 Claims, 4 Drawing Sheets

CYLINDER HEAD GASKET AND PROCESS FOR THE MANUFACTURE THEREOF

Figure 1:
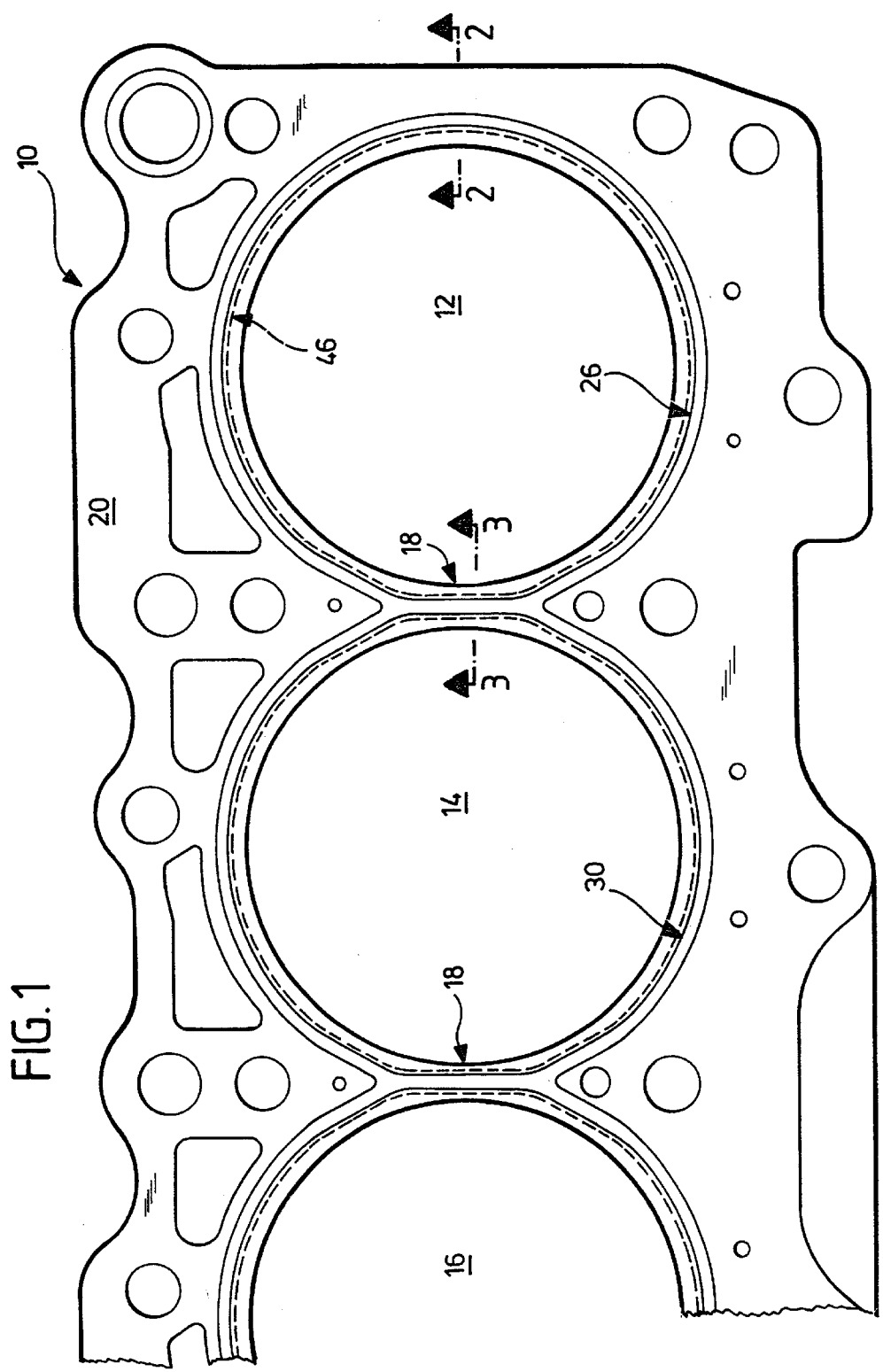

The invention relates to a cylinder head gasket with a gasket plate comprising several sheet metal layers and having at least one combustion chamber through-opening, a first sheet metal layer being provided with a ring-shaped sealing element surrounding the combustion chamber through-opening, projecting in the direction towards an adjacent, second sheet metal layer and resting against the second sheet metal layer at least when the cylinder head gasket is installed, the sealing element being capable of undergoing elastic deformation perpendicularly to the gasket plate, and a metallic spacer ring covered by the two sheet metal layers being secured to one of the two sheet metal layers, namely by a ring-shaped weld seam, radially adjacent to the sealing element for delimitation of the deformation of the sealing element, the spacer ring facing the other sheet metal layer and surrounding the combustion chamber through-opening. In particular, the sealing element is a bead which can have the configuration of a so-called full bead of approximately circular-arc-shaped cross section or a so-called half bead—the cross section of a half bead has approximately the shape of a step or a Z pulled almost flat. In principle, however, other bead-shaped sealing elements are also conceivable, which undergo elastic deformation perpendicularly to the plane of the gasket plate when clamping the cylinder head gasket and during operation of the engine. Mention is also made of the fact that the above-mentioned spacers are often also referred to as stoppers.

The invention further relates to a process for the manufacture of such a cylinder head gasket, more specifically, a process for producing the weld seam by means of which the spacer ring is joined to the sheet metal layer carrying it.

EP-O 486 817-B1 discloses a cylinder head gasket with a gasket plate formed by a sheet metal layer and with a sheet metal sealing ring secured to this sheet metal layer by laser spot welding, the sheet metal sealing ring directly surrounding a combustion chamber through-opening of the sheet metal layer and serving to delimit the elastic deformation of a bead (particularly when tightening the cylinder head screws), which is formed in the sheet metal layer forming the gasket plate, surrounds the combustion chamber through-opening and the sealing ring in the shape of a ring and has a height which is somewhat larger than the thickness of the sealing ring. The weld spots serving to secure the sealing ring to the sheet metal layer forming the gasket plate are configured and arranged such that their diameter is somewhat larger than their distance from center to center, measured in the circumferential direction of the sealing ring, so that weld spots adjacent to one another overlap one another. The laser beam is directed onto the upper side, i.e., the visible side of the sealing ring so that the ring surface of the sealing ring resting against the cylinder head (or possibly against the engine block) has a scale-like surface structure.

Such a weld seam consisting of a series of weld spots has quite a number of disadvantages: Firstly, it is not ensured that the joint between the sheet metal sealing ring and the sheet metal layer carrying it is really gas-tight, and, secondly, the above-mentioned scale-like surface structure of the weld seam can have disadvantageous effects: Owing to the engine dynamics, a bead is periodically elastically flattened during operation of the engine and then rises again, and this working of the bead automatically results in an oscillating, radial pushing movement with respect to the combustion chamber axis between the sheet metal ring in question and that surface against which the sheet metal ring is supported during operation of the engine. The rough upper side of the sheet metal ring then results in the risk that the sheet metal ring will be destroyed or released from the sheet metal layer carrying it, and if parts of the sheet metal ring drop into the combustion chamber this can result in the engine being destroyed.

Cylinder head gaskets of the kind mentioned at the outset are known from WO 97/31204 of the company Elring Klinger GmbH, wherein the spacer ring is secured in a gas-tight manner using a continuous wave laser to the sheet metal layer carrying the spacer ring by a continuous, ring-shaped laser weld seam which is closed within itself and is uniform except for an overlapping area. Areas at the start and end of the weld seam lie—in the plan view of the spacer ring—alongside one another or almost coincide in the above-mentioned overlapping area. The above-described disadvantages of the laser spot welding resulting from EP-0 486 817-B1 can be avoided with such a laser weld seam. On the other hand, it requires quite high expenditure to produce the continuous weld seam using a continuous wave laser, namely not only in view of the devices required therefor, but also because of the relatively high cycle time due to the duration of the welding operation in the series production of the cylinder head gaskets in question.

The object underlying the invention was to create a cylinder head gasket of the kind mentioned at the outset and to indicate a process for the manufacture thereof, thereby enabling at least the time expenditure for the production of a gas-tight weld seam joining the spacer ring to the sheet metal layer carrying it to be minimized.

This object is accomplished in accordance with the invention in that the spacer ring is secured in a gas-tight manner by electric pulse welding to the sheet metal layer carrying it by a continuous, ring-shaped, weld seam which is at least almost uniform overall and is closed within itself by the spacer ring and the sheet metal layer carrying it being clamped between a first electrode resting against the spacer ring and a counter electrode, and a current pulse adequate for the welding then being passed through a ring-shaped, sharp edge-like or bead-like contact projection of the first electrode pressed against the spacer ring, through the spacer ring, the sheet metal layer carrying it and through the counter electrode. The spacer ring and the sheet metal ring carrying it can only be clamped between the contact projection of the first electrode and the counter electrode.

A cylinder head gasket according to the invention produced in this way is then characterized by the spacer ring being secured in a gas-tight manner to the sheet metal layer carrying it by a continuous, ring-shaped, overall at least almost uniform weld seam made by electrowelding and closed within itself, which has on the free side of the spacer ring a ring-shaped, groove-like depression whose shape corresponds approximately to that of the contact projection of the first electrode.

The electric pulse welding by means of a ring-shaped, sharp edge-like or bead-like contact projection of an electrode makes very short cycle times possible (up to 60 or more weld seams can be produced per minute), as the welding energy normally stored capacitively in the welding device can be converted into a sufficiently high welding current concentrated through the contact projection and lasting only a few milliseconds, with a single current pulse being sufficient for the welding. Current pulses with a duration of only 12 to 15 milliseconds are given by way of example. In addition, the electric pulse welding devices available on the market enable the welding energy to be infinitely set and also constantly monitored by means of an electronic control.

Although it is preferable to press the one electrode with the sharp edge-like or bead-like contact projection against the spacer ring and to press the counter electrode with a flat end face against the sheet metal layer carrying the spacer ring, it is, in principle, also conceivable to press the one electrode with the sharp edge-like or bead-like contact projection against the sheet metal layer carrying the spacer ring or to provide both electrodes with ring-shaped, sharp edge-like or bead-like contact projections which are located opposite each other during the welding so that as short as possible a current path of the welding current through the spacer ring and the sheet metal layer results and the contact projections bring about an even stronger concentration of the welding current.

In principle, it is possible to weld a spacer ring as such to the sheet metal layer carrying it. However, above all, on account of the fact that the width of such spacer rings is relatively small, which also makes handling of these difficult, a different procedure is recommended: As such spacer rings have to be stamped out of a sheet metal layer anyhow, one can also weld a sheet metal disc whose outer diameter corresponds to the outer diameter of the later spacer ring to the sheet metal layer provided for carrying the spacer ring and then stamp an opening out of the disc in order to produce the spacer ring.

Figure 2:
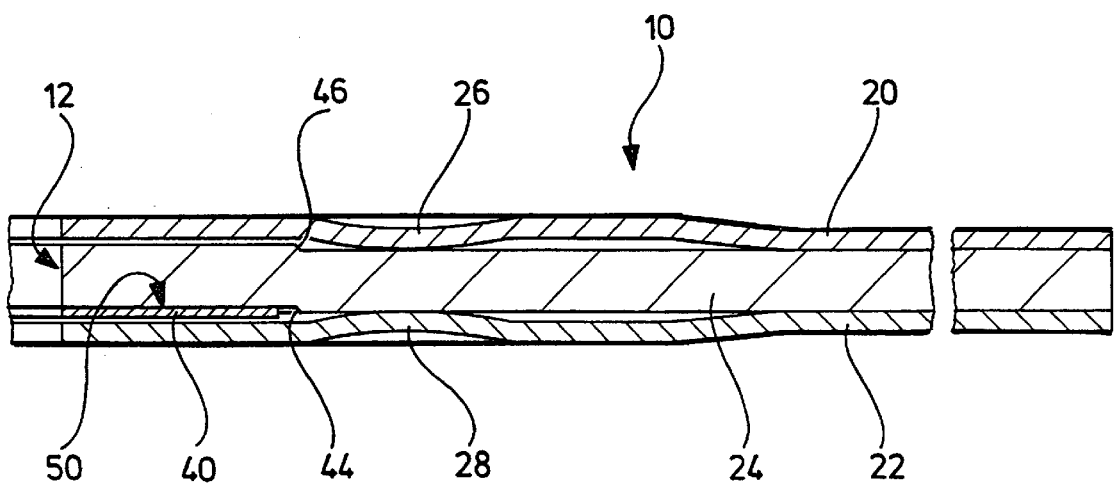
Figure 3:
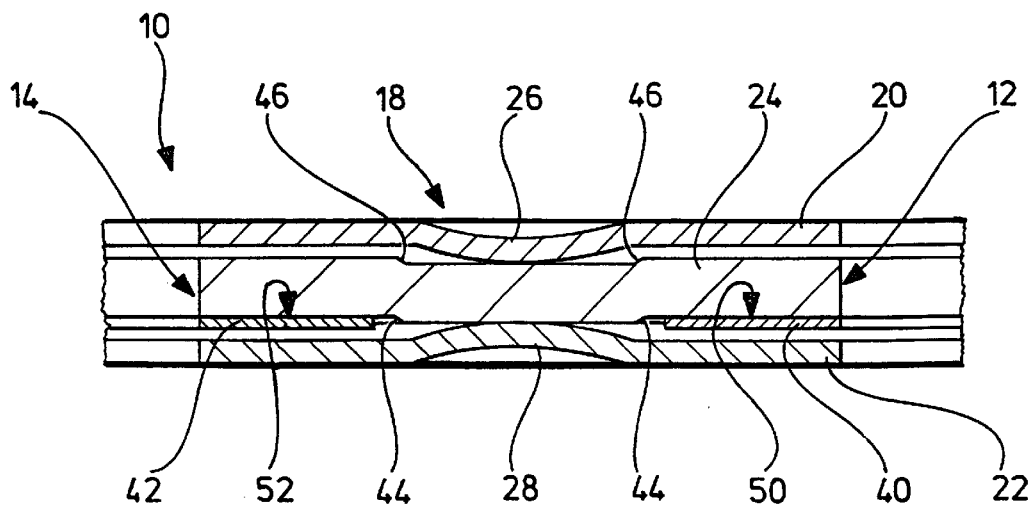
Figure 4:
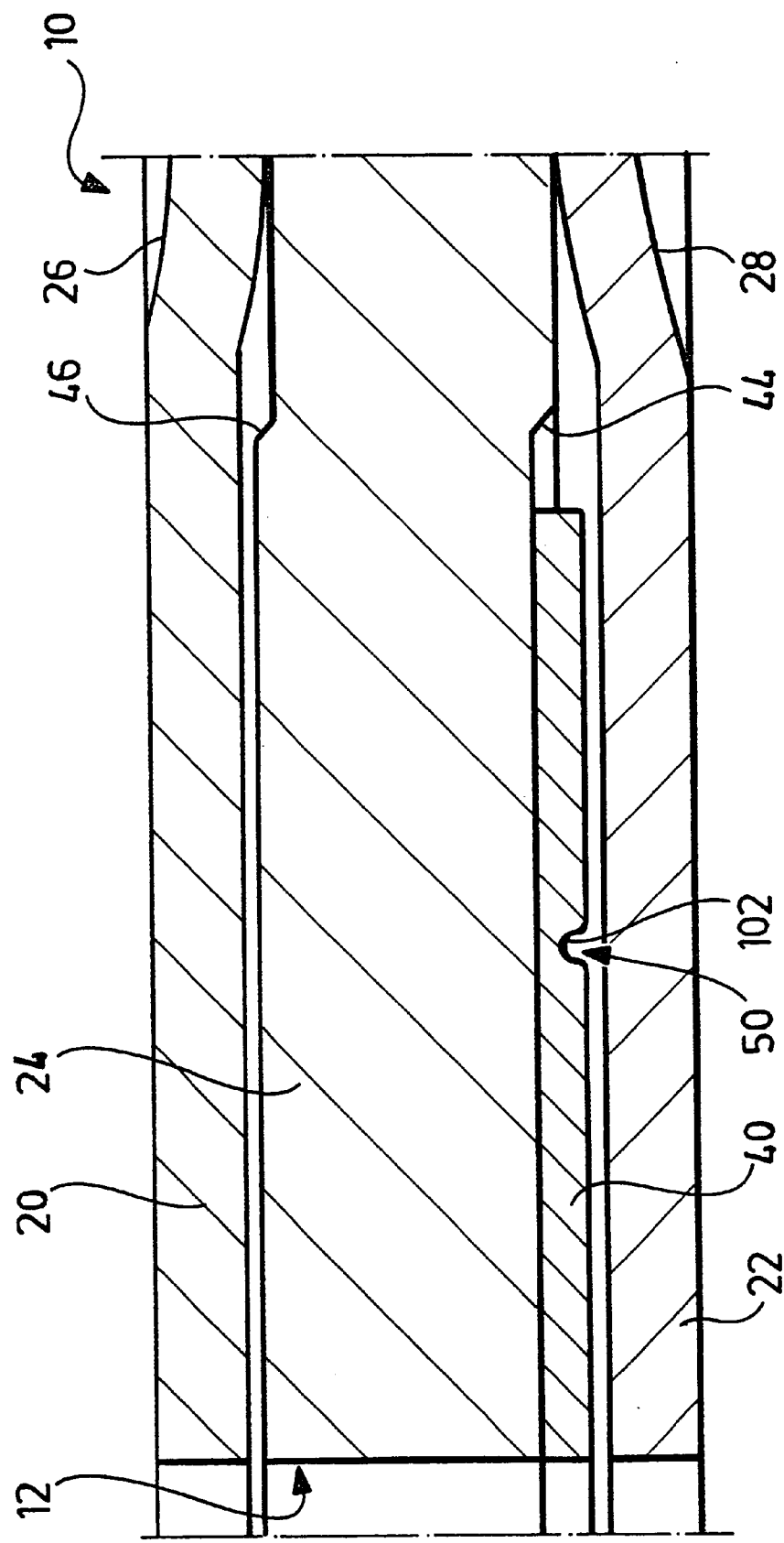

Further advantageous embodiments of the invention will be apparent from the attached claims and/or the following description and the appended drawings of a preferred embodiment of a cylinder head gasket according to the invention and a welding tool for welding on spacer rings. The drawings show:

FIG. 1 a plan view of a part of the cylinder head gasket;

FIG. 2 a section through an edge area of this cylinder head gasket corresponding to line 2—2 in FIG. 1;

FIG. 3 a section through a web area of the cylinder head gasket lying between two combustion chamber through-openings corresponding to line 3—3 in FIG. 1;

FIG. 4 a detail from the left part of FIG. 2 on a larger scale; and

Figure 5:
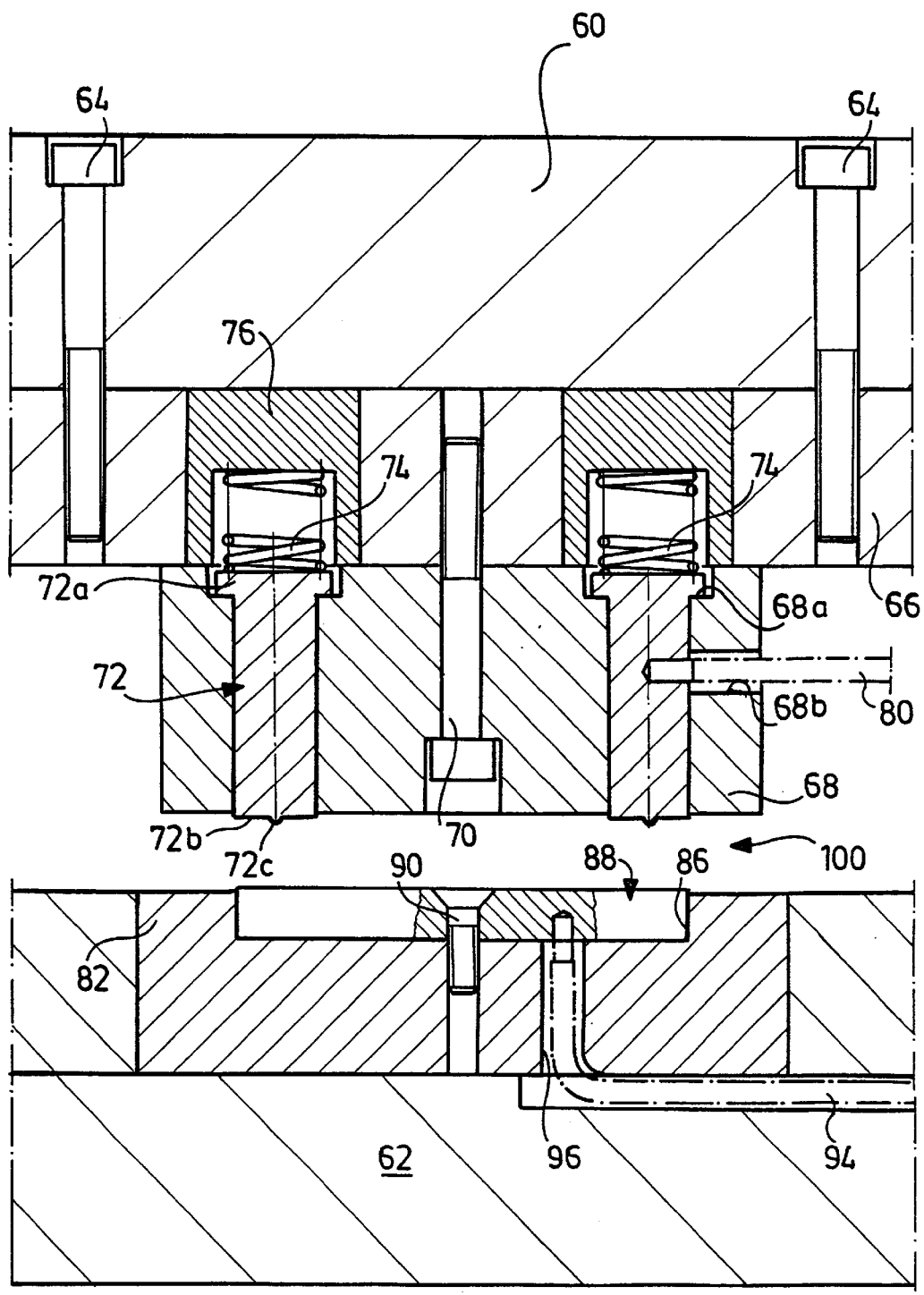

FIG. 5 a section through the welding tool.

The cylinder head gasket according to the invention, shown in FIG. 1, comprises a gasket plate 10 in which several combustion chamber through-openings are located alongside one another, only openings 12 and 14 of which are shown in their entirety and the adjacent opening 16 partially. The gasket plate 10 forms relatively narrow web areas 18 between combustion chamber through-openings adjacent to one another. Aside from that, the cylinder head gasket will not be described in further detail as this is not required for an understanding of the present invention.

In FIGS. 2 and 3, the edges of the combustion chamber through-openings have been given the reference numerals used for these openings in FIG. 1, and since FIG. 3 represents a section through the one web area 18, this reference numeral was also used in FIG. 3.

As will be apparent from FIGS. 2 and 3, the embodiment of the cylinder head gasket according to the invention shown therein comprises a gasket plate consisting essentially of three sheet metal layers, namely of two outer layers 20 and 22 and a center layer 24 arranged between the two outer layers, the thickness of the sheet metal of the center layer 24 being very much greater than that of the outer layers 20, 22.

Each of the combustion chamber through-openings of the cylinder head gasket according to the invention is completely surrounded by sealing elements which in the illustrated embodiment have the shape of beads which were produced by stamping operations in the outer layers 20 and 22. The beads surrounding the combustion chamber through-openings 12 were designated 26 and 28. Their cross section is circular-arc-shaped, they project in the direction towards the center layer 24 and rest with their caps against the center layer 24, more specifically, not only when the cylinder head gasket is installed in an engine, but already in the finished cylinder head gasket prior to its installation. The sheet metal layers 20, 22 and 24 are firmly connected to one another at certain locations of the gasket plate 10, for example, in the edge area of the gasket plate shown on the right in FIG. 2.

In FIG. 1, the reference numeral 26 is used for the bead surrounding the combustion chamber through-opening 12, similarly the reference numeral 30 for a bead produced in the outer layer 20 and surrounding the combustion chamber through-opening 14. As will be apparent from FIG. 1 in conjunction with FIG. 3, the narrow web area 18 between the through-openings 12 and 14 causes the beads 26 and 30 to coincide in this web area, i.e., to run into each other, and the same applies to the beads produced in the outer layer 22. For this reason only reference numerals 26 and 28 were used in FIG. 3, since only a single bead remains present in each outer layer in the area of section 3—3.

In order that the beads can fulfill their sealing function, namely the task of preventing gases from escaping from the combustion chambers in a radial direction (relative to the axes of the combustion chambers) between the sheet metal layers 20 and 24, and 22 and 24, respectively, the beads must still be able to yield elastically in the direction perpendicular to the plane of the gasket plate 10 and rest resiliently against the center layer 24 when the cylinder head screws are tightened and the engine is operating. A precondition for this is that the beads are not able to be pressed completely flat by pressing forces oriented perpendicularly to the plane of the gasket plate 10. To ensure this, each combustion chamber through-opening is surrounded by a spacer ring, the through-opening 12 by a spacer ring 40, the through-opening 14 by a spacer ring 42. These spacer rings are made from a metal sheet whose thickness, in accordance with the invention, is only a fraction of the thickness of that sheet metal layer to which the pertinent spacer ring is attached. In the embodiment shown, the spacer rings are attached to the center layer 24, but the thickness of the sheet metal of the spacer rings is advantageously also only a fraction of the thickness of the sheet metal of the outer layer 20 and the outer layer 22, respectively.

In order to limit the deformation of both the beads of the outer layer 20 and the beads of the outer layer 22 in the desired way, one could mount one respective spacer ring around each combustion chamber through-opening on each side of the center layer 24. However, in order to manage with a single spacer ring for each combustion chamber through-opening, the center layer 24 has for each combustion chamber through-opening an offset, which surrounds the combustion chamber through-opening in the shape of a ring and which on that side of the center layer to which the spacer rings are attached, forms a step 44 surrounding the pertinent combustion chamber through-opening in the shape of a ring at a radial spacing therefrom and projecting in the direction towards the outer layer 22. On the other side of the center layer 24 there is thus for each step 44 a step 46 which leads to a corresponding depression. If the height of the steps 44 is less than the thickness of the sheet metal of the spacer rings, the latter prevent the beads in the outer layer 22 from being able to be pressed completely flat. In an analogous way, those areas of the center layer 24 which lie between the steps 46 and the adjacent combustion chamber through-openings prevent the beads of the outer layer 20 from being able to be pressed completely flat by the above-mentioned pressing forces.

It is advantageous for the sealing effect of the beads for the two sides of the center layer 24 and/or the sides of the outer layers 20 and 22 facing the latter to be coated with a conventional sealing material.

In FIGS. 2, 3 and 4, those weld seams 50 and 52 are indicated, by means of which the spacer rings 40 and 42 were joined in a gas-tight manner to (uncoated areas of) the center layer 24. As will be apparent from the above statements, the weld seam 50 surrounds the combustion chamber through-opening 12, the weld seam 52 the combustion chamber through-opening 14, more specifically, approximately in the shape of a circular ring, in each case, and each weld seam is closed within itself and uniform throughout the length of its circumference.

The weld seams joining the spacer rings to the center layer 24 are produced by electric pulse welding with the aid of the tool shown in FIG. 5. However, FIG. 5 can only show part of a tool with which all weld seams of a cylinder head gasket can be made at the same time and in one cycle.

The tool or the part of the tool shown in FIG. 5 comprises an upper and a lower frame 60 and 62, respectively. Attached to the upper frame 60 by means of screws 64 is an abutment plate 66 to which a guide block 68 is screwed by means of screws 70. A first electrode in the form of an annular electrode 72 is guided in this guide block 68 consisting of an electrically insulating material for displacement in the vertical direction in accordance with FIG. 5. Pressure springs 74 arranged in an annular or several pot-shaped receptacles 76 consisting of electrically insulating material act upon the annular electrode 72. FIG. 5 shows the lowermost position of the annular electrode 72 which is defined by a collar 72a of the annular electrode and a stop 68a of the guide block 68 and in which the annular electrode projects downwards out of the guide block 68. There is formed on the bottom end face 72b of the annular electrode 72 a contact projection 72c of sharp edge-like or bead-like cross section, which in the plan view of the end face 72b from below forms a ring closed within itself. Finally, the guide block 68 has a through-opening 68b through which a connection cable 80 leading to the annular electrode 72 and attached thereto is guided. The clear cross section of the through-opening 68b allows such vertical movement of the annular electrode 72 and the connection cable 80 as is necessary for performing the welding operation.

An electrode receptacle 82 consisting of electrically insulating material is attached in a manner not shown in further detail to the lower frame 62. The electrode receptacle has a recess 86 which receives a plate-like second electrode 88 which is fixedly connected by a screw 90 to the electrode receptacle 82. The electrode 88 has a flat, horizontally extending upper side, is preferably of circular disc shape in the plan view, and has an outer diameter which is somewhat larger than the diameter of the circular ring-shaped contact projection 72c. A second connection cable 94 is led through a through-opening 96 of the electrode receptacle 82 and fixedly connected to the electrode 88.

The welding tool forms between the guide block 68 or the ring electrode 72, on the one hand, and the electrode receptacle 82 or the electrode 88, on the other hand, a horizontal gap 100 for pushing in and through the sheet metal parts which are to be welded to one another or which are welded to one another.

For welding, for example, the spacer ring 40 or a corresponding sheet metal disc to the center layer 24, the latter is pushed with the spacer ring or the sheet metal disc resting on top of the center layer in a horizontal direction into the gap 100 of the welding tool such that the contact projection 72c lies at the center over the spacer ring 40 or the sheet metal disc, and the center layer 24 rests on the electrode 88. The center layer and the spacer ring or the sheet metal disc are then clamped between the contact projection 72c and the electrode 88 by lowering the upper frame 60, with the clamping force being generated by the pressure springs 74. In this state, a welding current pulse is passed through the electrodes 72 and 88, the center layer 24 and the spacer ring 40 or the sheet metal disc, which causes the two sheet metal parts to be welded to each other, and as a result of the clamping force there is produced in the spacer ring 40 or the sheet metal disc a groove-like, circular ring-shaped depression 102, which is shown in FIG. 4 and whose profile corresponds to that of the contact projection 72c.

After raising the upper frame 60, the welded together sheet metal parts can then be removed from the welding tool. Pulse welding power supplies for generating the necessary welding current pulses are available on the market, for example, from the company RESISTRONIC AG, Biel, Switzerland, under the type designation 256.6-2 Hz.

For reasons of completion only, the following is pointed out:

When a correspondingly high welding current is chosen, a single welding current pulse is adequate to join a spacer ring in a gas-tight manner to the sheet metal layer carrying it. The formation of a sharp edge-like or bead-like contact projection on one of the electrodes results in the welding current being concentrated onto a narrow area of spacer ring or sheet metal disc, on the one hand, and sheet metal layer, on the other hand. Finally, the welding tool can be a component of a follow-on composite tool in which several operations are carried out one after the other, inter alia, also the stamping of the spacer ring or an opening out of a sheet metal disc then forming the spacer ring.

Use of the process according to the invention results on the free side of the spacer ring and/or the sheet metal layer carrying the latter in a ring-shaped, groove-like depression which corresponds to the sharp edge-like or bead-like contact projection of the electrode and, consequently, is smooth-walled throughout and forms a ring closed within itself, which does not have any joint or any overlapping area in which end areas of the groove-like depression run alongside one another (in the plan view). This would be different if the weld seam were produced using the known electric roll welding, as the roll welding of a ring-shaped weld seam with a relatively small diameter would result in chatter marks or similar irregularities, above all, when a roll has a circumference with a sharp edge-like profile. In this connection one must bear in mind that the combustion chamber through-openings of cylinder head gaskets usually have relatively small diameters, with which roll welding would be problematic in any case, if not even impossible, quite apart from the fact that the roll welding would require much more time than the process according to the invention which works with ring electrodes.

What is claimed is:

1. Process for the manufacture of a cylinder head gasket with a gasket plate comprising several sheet metal layers and having at least one combustion chamber through-opening, a first sheet metal layer being provided with a ring-shaped sealing element surrounding the combustion chamber through-opening, projecting in the direction towards an adjacent, second sheet metal layer and resting against the second sheet metal layer when the cylinder head gasket is installed, said sealing element being capable of undergoing elastic deformation perpendicularly to the gasket plate, and a metallic spacer ring covered by said first and second sheet metal layers being secured by an annular weld seam to one of said first and second sheet metal layers radially adjacent to the sealing element for delimitation of the deformation of the sealing element, said spacer ring facing the other one of said first and second sheet metal layers and surrounding the combustion chamber through-opening, wherein the process includes securing the spacer ring in a gas-tight manner by electric pulse welding to said one of said first and second sheet metal layers, said electric pulse welding including the steps of clamping in contact the spacer ring and said one of said first and second sheet metal layers between a first electrode resting against the spacer ring and a second electrode resting against said one of said first and second sheet metal layers and passing a current pulse sufficient for the welding through an annular, sharp edge-like or bead-like contact projection of one of said first and second electrodes, through said spacer ring and said one of said first and second sheet metal layers and through the other of said first and second electrodes to form a continuous, annular, gas-tight weld seam between said spacer ring and said one of said first and second sheet metal layers.

2. Process as defined in claim 1, wherein the contact projection is pressed against the spacer ring (40).

3. Process as defined in claim 1, wherein instead of a spacer ring, a sheet metal disc is welded to said one of said first and second sheet metal layers, and an opening is then stamped out of the disc so as to produce the spacer ring.

4. Cylinder head gasket with a gasket plate comprising several sheet metal layers and having at least one combustion chamber through-opening, a first sheet metal layer being provided with a ring-shaped sealing element surrounding the combustion chamber through-opening, projecting in the direction towards an adjacent, second sheet metal layer and resting against the second sheet metal layer when the cylinder head gasket is installed, said sealing element being capable of undergoing elastic deformation perpendicularly to the gasket plate, and a metallic spacer ring covered by said first and second sheet metal layers being secured by an annular weld seam to one of said first and second sheet metal layers radially adjacent to the sealing element for delimitation of the deformation of the sealing element, a free side of said spacer ring facing the other one of said first and second sheet metal layers and surrounding the combustion chamber through-opening and said one of said first and second sheet metal layers having a first side facing away from the spacer ring, wherein the spacer ring is secured in a gas-tight manner to said one of said first and second sheet metal layers by a continuous, annular weld seam made by electrowelding, at least one of said free spacer side and said first metal layer side having an annular, groove-like depression within said weld seam.

5. Cylinder head gasket as defined in claim 4, wherein the thickness of the spacer ring measured perpendicularly to the plane of the gasket plate is only a fraction of the thickness of each of said first and second sheet metal layers.

6. Cylinder head gasket as defined in claim 4, wherein the thickness of the spacer ring is approximately from 0.1 to 0.15 mm and the thickness of the second sheet metal layer is approximately from 0.6 to 1.1 mm.

7. Cylinder head gasket as defined in claim 6, wherein the thickness of the second sheet metal layer is approximately from 0.85 to 1.05 mm.

8. Cylinder head gasket as defined in claim 4, wherein the spacer ring forms a further sealing element bordering directly on the combustion chamber through-opening.

9. Cylinder head gasket as defined in claim 4, wherein a further outer sheet metal layer is provided, and the second sheet metal layer is arranged between said further outer sheet metal layer and said first sheet metal layer, wherein said second sheet metal layer is offset radially adjacent to the spacer ring by an amount which is smaller than the thickness of the spacer ring, and wherein said further outer sheet metal layer is also provided with a sealing element corresponding to the sealing element of the first sheet metal layer.

10. Cylinder head gasket as defined in claim 4, wherein the weld seam made by electrowelding has a groove-like depression only on the free side of the spacer ring.

11. Process for the manufacture of a cylinder head gasket with a gasket plate comprising several sheet metal layers and having at least one combustion chamber through-opening, a first sheet metal layer being provided with a ring-shaped sealing element surrounding the combustion chamber through-opening, projecting in the direction towards an adjacent, second sheet metal layer and resting against the second sheet metal layer when the cylinder head gasket is installed, said sealing element being capable of undergoing elastic deformation perpendicularly to the gasket plate, and a metallic spacer ring covered by said first and second sheet metal layers being secured by an annular weld seam to one of said first and second sheet metal layers radially adjacent to the sealing element for delimitation of the deformation of the sealing element, said spacer ring facing the other one of said first and second sheet metal layers and surrounding the combustion chamber through-opening, wherein the process includes forming said spacer ring by (a) securing a sheet metal disc in a gas-tight manner by electric pulse welding to said one of said first and second sheet metal layers, said electric pulse welding including the steps of clamping in contact said sheet metal disc and said one of said first and second sheet metal layers between a first electrode resting against said sheet metal disc and a second electrode resting against said one of said first and second sheet metal layers and passing a current pulse sufficient for the welding through an annular, sharp edge-like or bead-like contact projection of one of said first and second electrodes, through said sheet metal disc and said one of said first and second sheet metal layers and through the other of said first and second electrodes to form a continuous, annular, gas-tight weld seam between said sheet metal disc and said one of said first and second sheet metal layers, and (b) then forming an opening through said sheet metal disc inwardly of said weld seam to provide said spacer ring.

\* \* \* \* \*